May 7, 1963 G. ALEXANDROVICH 3,088,742

COMPENSATED TONE ARMS

Filed Oct. 7, 1960 2 Sheets-Sheet 1

INVENTOR.
GEORGE ALEXANDROVICH
BY
Darby & Darby
ATTORNEYS

May 7, 1963 G. ALEXANDROVICH 3,088,742

COMPENSATED TONE ARMS

Filed Oct. 7, 1960 2 Sheets-Sheet 2

INVENTOR.
GEORGE ALEXANDROVICH
BY Darby & Darby
ATTORNEYS

United States Patent Office 3,088,742

Patented May 7, 1963

3,088,742

COMPENSATED TONE ARMS

George Alexandrovich, Richmond Hill, N.Y., assignor to Fairchild Recording Equipment Corporation, Long Island City, N.Y., a corporation of New York Filed Oct. 7, 1960, Ser. No. 92,725

4 Claims. (Cl. 274—23)

This invention relates to tone arms and more particularly to a tone arm which is compensated to counteract skating force and stylus arm displacement and the effects due thereto.

Although many improvements have been made in systems for reproducing sound recorded on disc records, technical deficiencies are still present in some of the system components, so that the average system does not reproduce the recorded information with full fidelity. It has been recognized generally that the weakest link in a sound reproducing system is the tone arm and the cartridge mounted thereon. The major objectives which are desired in tone arms and cartridges are maximum fidelity reproduction of the information recorded on the disc and minimum wear of both the record and the tone arm cartridge and stylus.

One of the inherent operating factors which acts on the tone arm in a manner such as to limit the reproduction capabilities of a system is the so-called skating force. The skating force is that force which tends to pull the tone arm towards the center of the record. This force is produced by the friction between the cartridge stylus and the walls of the record grooves. In general, the skating force is dependent upon the magnitude of the tone arm off-set angle, the length of the tone arm, the tracking force, and the material out of which the record is made.

The effects due to the skating force are clearly undesirable. For example, the skating force produces uneven distribution of the stylus tracking force in the record groove which results in distortion of the reproduced sound. This uneven distribution of tracking pressure and resultant distortion is present in records having either vertically or laterally modulated grooves. The skating force also causes excessive record and stylus wear due to the necessity of applying more stylus tracking force in order to track high level recordings.

While the deleterious effects due to the skating force occur in both monophonic and stereophonic records, they are more evident in stereophonic records made according to the 45°–45° system, in which information is recorded on perpendicular groove walls which are inclined at an angle of 45° to the horizontal plane. On a stereo record, the skating force causes an uneven distribution of tracking force between the two groove walls. This uneven distribution of force affects the right channel more then the left and if predominantly high level information is recorded on the right groove wall the high level signals, when reproduced, will be heavily distorted. The uneven distribution of tracking force will also produce excessive and uneven record and stylus wear. Similar effects also occur in monophonic records.

In order to counteract the skating force and to substantially eliminate the effects caused by it, another force which is equal in magnitude and opposite in direction to the skating force (an anti-skating force) is applied to the tone arm. In accordance with the invention, this is accomplished by providing the vertical pivot of the tone arm with an anti-skating spring which exerts a force approximately equal in magnitude but opposite in direction to the skating force. The application of the anti-skating force improves the operation of the tone arm, so that the tracking pressure is distributed more evenly between the channels (groove walls) of a record, thereby enabling better tracking with less force. Further, the right channel distortion is reduced and record wear between the channels is equalized, thereby increasing the lifespan of the cartridge and stylus. By counteracting the adverse effects produced by the skating force, the recorded information is reproduced more faithfully with less distortion and longer life is obtained from the cartridge, stylus and the record. It has also been determined that distortion occurs in the reproduced signal due to the tracking error which is introduced on a cartridge having a compliant stylus arm by the action of the friction between the stylus and the record groove. This tracking error is also substantially eliminated by the anti-skating spring.

It is therefore an object of this invention to provide a tone arm which is compensated to counteract the skating force.

Another object of this invention is to provide a tone arm and cartridge which are compensated to counteract skating force, so that the reproduction of the recorded information will approach the quality of that produced from master magnetic tapes.

Another object of this invention is to provide a tone arm having an anti-skating force compensating spring.

Still a further object of the invention is to provide compensation for the tracking error occurring with a compliant cartridge due to the friction between the stylus arm and the record groove.

Other objects and advantages of the present invention will become more apparent upon reference to the following specification and annexed drawings, in which.

Figures 1, 2, 3:
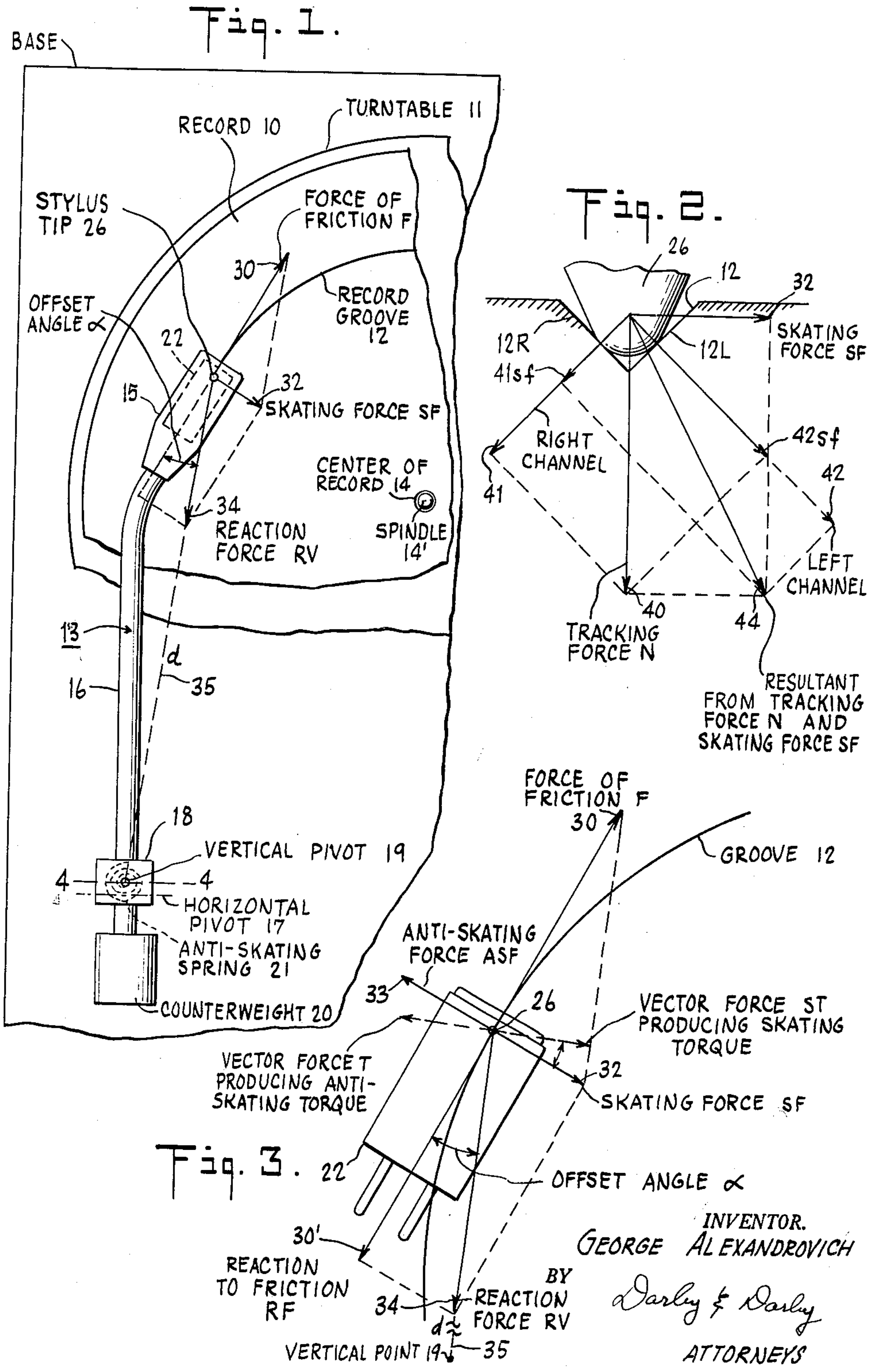
FIGURE 1 is a diagram of the forces acting on a tone arm as it rides in the groove of a disc type record.
FIGURE 2 is a diagram of the distribution of the stylus tracking force for a 45°–45° stereo record.
FIGURE 3 is a diagram of the forces acting on a cartridge.

Referring to FIG. 1, a section of a disc record 10 is shown riding on a turntable 11. The record 10 has a plurality of grooves engraved thereon in a spiral pattern in any suitable manner which is well known in the art. Only one of the grooves 12 is shown. Information is recorded in the record groove in any suitable manner, for example, laterally or vertically. The record 10 has a center hole 14 which is placed around a spindle 14' on the turntable. The turntable provides the rotational motion for the record 10 by any suitable means such as a motor or belt drive (not shown).

Figure 4:
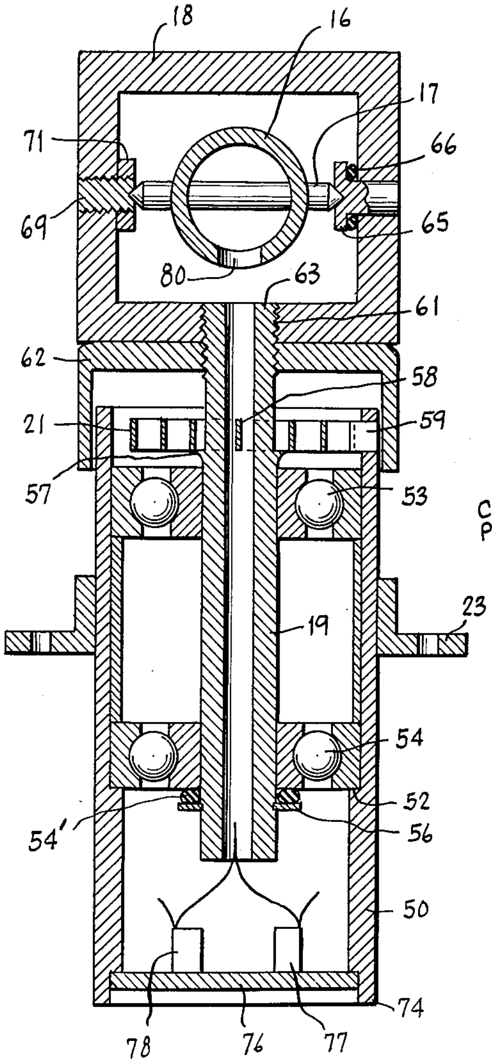
FIGURE 4 is an elevation on an enlarged scale of the mounting post including the anti-skating spring taken partially in section along line 4—4 of FIGURE 1.

A tone arm 13, which is formed by an arm tube 16 and a cartridge shell 15 is mounted on a suitable base by a flange 23 (FIGURE 4). The flange is fastened to a bearing tube 50 (FIGURE 4) which has therein the vertical pivot 19 for the tone arm and a spiral anti-skating spring 21. The anti-skating spring is attached to the bearing tube 50 and the vertical pivot shaft 19 in a manner to provide an anti-skating force acting in a horizontal plane in a direction away from the center of the record. This is described in detail later. A yoke 18 is mounted on the vertical pivot shaft 19. The yoke 18 houses a horizontal pivot 17 and also secures the arm tube 16 therein. The tone arm 13 is free to rotate in a horizontal plane about the vertical pivot 19 and in a vertical plane about the horizontal pivot 17.

Located at the end of the arm tube 16 adjacent the yoke 18 is an adjustable counterweight 20 which serves to balance the tone arm 13 and to provide the desired tracking force for a cartridge 22 which is mounted within the cartridge shell 15. The cartridge 22 has a stylus 26 at the end of a stylus arm (not shown) which rides in the record grooves. The stylus arm is coupled to an element within the cartridge 22 which converts the groove variations into an electrical signal which is subsequently amplified and reproduced.

As the stylus 26 rides in the groove 12, several forces operate on it in the absence of the anti-skating force. These forces include the force of friction F, represented by the vector 30, which is in a direction tangential to the groove 12 at the point where the stylus 26 rides in the groove. The magnitude of the friction force F is proportional to the coefficient of friction and the tracking force. The skating force SF, represented by vector 32, is perpendicular to the friction force vector 30 at the stylus tangent point and acts in a direction toward the center of the record. Due to the action of the friction force F and the skating force SF a reaction force RV is developed which is represented by the vector 34. The vector 34 is the resultant of friction force vector 30 and skating force vector 32. The reaction force vector 34 lies along a line 35 drawn between the stylus 26 and the vertical pivot 19. The angle between line 35 and the tangent to the groove is called the offset angle $\alpha$. The distance from stylus 26 to vertical pivot 19 is called "*d*."

It can therefore be seen from FIGURE 1 that the major factor causing skating is friction, which is the pulling force exerted on the stylus 26 by the walls of the groove 12.

The effect of the skating force SF on the reproduction of information recorded in the groove of a stereophonic 45°–45° record is shown by the vector diagram of FIGURE 2. The stereo record 10 has information recorded on the perpendicular left and right walls 12L and 12R of the groove 12. As the stylus 26 rides in the groove it exerts a downward tracking force N, represented by the vector 40. The tracking force N is adjustable by the counterweight and by the dynamic offset distance between the horizontal and vertical pivots. If there were no skating force SF acting on the tone arm, the tracking force vector 40 would be resolvable into the right and left channel force vectors 41 and 42. The two vectors 41 and 42 would be equal in magnitude and perpendicular to each other, indicating that tracking force was applied equally to both walls of groove 12.

Due to the skating force SF the stylus 26 is pulled towards the center of the record (to the right of the drawing) and more tracking force is applied to left groove wall 12L than to right wall 12R. With the skating force SF acting a new vector diagram may be drawn. The resultant of the tracking and skating force vectors 40 and 32 is represented by the vector 44. Resolving vector 44 into the right and left channel components, it is now seen that the force applied to the right wall 12R represented by vector 41*sf*, has decreased while the force applied to the left wall 12L, represented by the vector 42*sf*, has increased. Therefore, information which is recorded on the right groove wall 12R will be distorted when reproduced since the stylus would not exert the proper tracking pressure on the wall 12R. High level signals recorded on the wall 12R would be severely distorted. It can also be seen that since more force is applied to wall 12L than to wall 12R, that the former will wear faster than the latter and the stylus 26 will also wear unevenly.

FIGURE 4 is a vector diagram of the pertinent forces necessary for use in determining the amount of anti-skating force to be applied by the anti-skating spring 21. In FIGURE 4, the vectors 30, 32 and 34 which respectively represent the force of friction F, skating force SF, and reaction to friction force RV, and the offset angle $\alpha$ are the same as shown in FIGURE 1. Vector 30' represents the reaction to the friction force RF, which is equal in magnitude and opposite in direction to the force of friction F.

From FIGURE 3, the following relationship for the absolute magnitude of the friction force F and reaction force RF is obvious:

(1) $$|F|=|RF|=|-F|$$

It may also be derived from FIGURE 3 that:

(2) $$RV=\frac{RF}{\cos \alpha}=\frac{-F}{\cos \alpha}$$

and (3) $$\frac{RF}{\cos \alpha} \sin \alpha=SF$$

or (4) $$SF=RF \tan \alpha=-F \tan \alpha$$

where $F$=the friction force=$N$
$N$=the tracking force
$\mu$=coefficient of friction
$RF$=the reaction to friction force
$RV$=reaction force
$SF$=skating force and
$\alpha$=the offset angle.

The anti-skating force represented by vector 33 should therefore be equal in magnitude but opposite in direction to the skating force, or:

(4a) $$ASF=-SF=F \tan \alpha$$

The skating force has a force component ST acting about the vertical pivot 19 through arm length "*d*" and producing a clockwise torque in a horizontal plane. To counteract this torque, a torque of the same magnitude, but opposite in direction, has to be applied to the tone arm. This counteracting torque is called the anti-skating torque and it is produced by the component T of the anti-skating force ASF which is applied to the pivot 19 and acts through the arm length "*d*." Its magnitude is derived as follows:

(5) $$T=-ST$$

where

ST=the force producing the skating torque
$T$=the force producing the anti-skating torque and
$d$=the length of the tone arm from the stylus to the vertical pivot.

Equation 5 may be rewritten as:

(6) $$T=-SF \cos \alpha$$
$$=F \tan \alpha \cos \alpha$$

or (7) $$T=\mu N \sin \alpha=F \sin \alpha$$

The skating torque, which is equal to $ST \times d$ is therefore equal to the anti-skating torque which is equal to $$\mu N \sin \alpha \times d$$

To illustrate the magnitude of the anti-skating torque force which must be applied, consider an arm having an offset angle $\alpha$ of 21°, and 4 grams of tracking pressure riding on a vinyl record. The magnitude of the friction force F is obtained by making friction tests on a typical record at the specified tracking force and at different groove radii as measured from the record center. In general, it has been determined that the friction force F varies as a function of the nature of the modulated grooves, i.e. amplitudes and frequency of the recorded signal, and the tracking force applied with an increase in either causing an increase in F. The friction force also increases as the tone arm moves closer to the center of the record. In the example being described it was derived that the friction force was approximately 1.8 grams for maximum record radius and 2.4 grams for minimum record radius for a signal of 1000 cycles having a recorded velocity of 30 centimeters per second. By substituting these values into Equation 4 the skating force may be derived:

$SF=-1.8\times0.39=-0.7$ gram for maximum record radius $SF=-2.4\times0.39=-0.94$ gram for minimum record radius The anti-skating spring must therefore exert a force ASF of approximately the same magnitude.

An experimental determination of the effects produced by different springs 21, in the example being described, was made by observing the cartridge output signal on an oscilloscope. It was found that the minimum distortion of the output signal occurred when the anti-skating force was approximately .8 gram and 1.2 grams at the maximum and minimum groove radii. This was close to the value calculated. In practice, the anti-skating force exerted by spring 21 is chosen to be somewhere between the minimum and maximum limits in order to achieve satisfactory results.

Another way of decreasing the distortion produced by skating force is to change the length of the tone arm. It can be shown by calculation that the longer the length of the tone arm the smaller the tracking error, the overhang distance, and the offset angle. It has been experimentally determined that when the length of the tone arm is increased that the anti-skating force that has to be applied is proportionately smaller to the increase in tone arm length. This means that anti-skating torque remains about the same for an arm having a longer length as it does for an arm having a shorter length.

FIGURE 4 shows the details of the tone arm mounting including the horizontal and vertical pivots 17 and 19 and the anti-skating spring 21 according to a preferred embodiment of the present invention. The mounting structure includes the cylindrical bearing tube 50 to which is fastened the base mounting flange 23. The tube 50 is recessed and formed with an internal shoulder 52 on which is mounted a ball bearing 54. The vertical pivot shaft 19 is mounted within the bearing 52 and is held at the bottom thereof by a soft rubber washer 54' and a retaining ring 56. A second ball bearing 53 is placed around the shaft 19 near the upper end of the tube 50, so that shaft 19 is free to rotate.

The anti-skating spring 21 is slipped over the shaft 19 and rests on top of a small shoulder ring 57. The inner end of the spring spiral is hooked into a slot 58 on the shaft 19 while the other end of the spring hooks into a slot 59 on the bearing tube 50. The slots are so spaced that the spring exerts the anti-skating force in the proper direction.

The upper end of shaft 19 has a threaded portion 61 to accommodate a threaded spring cap 62. The cap 62 prevents the spring from coming out of the bearing tube 50 and also prevents dirt and dust from accumulating inside of the tube.

The threaded portion 61 of the shaft 19 is screwed into a threaded hole 63 in the yoke 18. The horizontal pivot 17 passes through a hole in the arm tube 16 and is fastened thereto. The pivot has tapered ends one of which rides in a pivot stud 55 which is spaced from the wall of the yoke by a rubber washer 66. The other tapered end rides against a set screw 69 which is screwed into a nut 71 mounted inside of the yoke 18. The set screw 69 provides an adjustment for the horizontal pivot.

The bottom of the bearing tube 50 is recessed with a shoulder 74 which accommodates an insulated connector 76. The connector has contacts 77 and 78 to which wires are connected which extend through the bearing tube and the hollow portion of the shaft 19. The wires then pass into the yoke 18, through a hole 80 in the arm tube 16, and then to the cartridge 22 to make electrical contact therewith in the conventional manner. Electrical connection is made from the contacts of connector 76 to the preamplifier or amplifier circuit with which the tone arm is used. As many contacts and wires are used as is compatible with the system, i.e. two for monophonic and four for stereo.

As can be seen, the horizontal pivot 17 allows the arm tube 16 to be moved up and down as desired for raising the arm from or lowering it to the record on the turntable. The tone arm pivots in a horizontal plane around the vertical pivot 19 which moves freely within the ball bearings 52 and 53. It can be seen that the anti-skating spring 21 exerts a force away from the center of the record. As has been discussed before, this anti-skating spring 21 provides the force which counteracts the skating force. Therefore, the deleterious effects on the reproduction of the recorded signal brought about by the skating force are substantially reduced.

While the effect of the anti-skating spring on the skating force has been discussed above, the anti-skating spring also corrects distortion which is introduced by excessively compliant cartridges. On some cartridges when the record is played, the stylus arm (the arm which carries the stylus tip) moves in a direction away from the record center. The more compliant the cartridge, the greater the displacement. The displacement prevents cartridges from performing at their best since stylus arm displacement produces a change in tracking angle and a resultant increase in distortion. For a typical cartridge having a compliance of $4\times10^{-6}$ centimeters/dyne or more, the stylus arm displacement could exceed 5°. While it is normally possible to hold tracking error within limits of ±1° the additional error of 5° or more, due to the compliance of the cartridge, would produce considerable distortion in the output signal.

Figure 5:
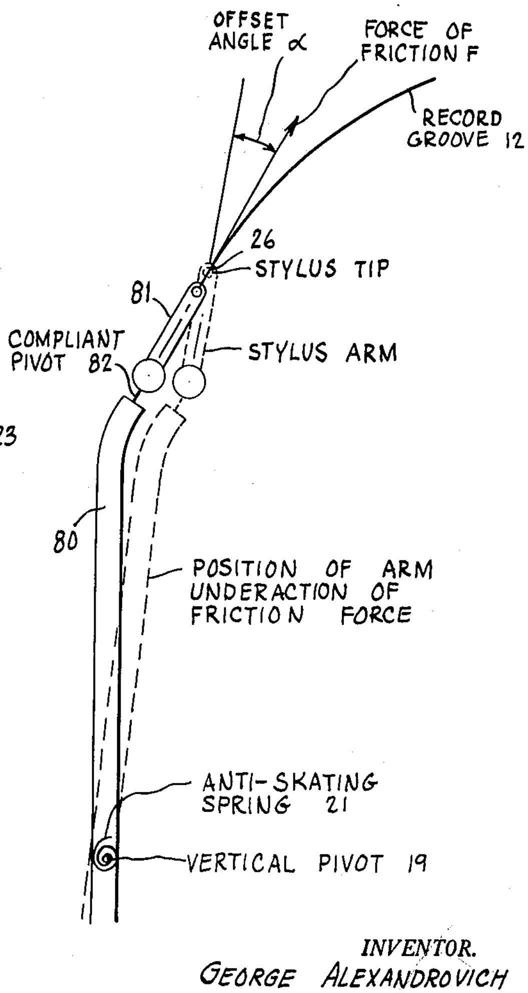
FIGURE 5 is a diagram of a tone arm showing the effects on tracking error due to the use of a compliant cartridge.

FIGURE 5 shows the effects of friction between the groove and the stylus for cartridges having a substantial amount of compliance and tone arms having a large offset angle. The tone arm 80 has a vertical pivot 19 at one end and a stylus 26 at the other end which is fixed to a stylus arm 81. The stylus arm 81 is mounted on a compliant pivot 82 which may be made of, for example, rubber. The tone arm 80 represented by the dotted lines shows the condition when an angular tracking error is introduced by the stylus arm compliance. Due to the friction force of the stylus in the groove the stylus arm is pulled away from the center of the record and an angular tracking error is introduced since the stylus arm no longer lies along the line which is drawn tangent to the record groove at the point of stylus contact. It can be seen from the diagram that if the compliance of the stylus arm is large enough that the angular tracking error introduced will equal the offset angle. It should also be realized that non-compliant cartridges produce substantially no tracking error. However, most records cannot be played with non-compliant cartridges so the tracking error caused by the cartridge compliancy must be accepted and counteracted. In the present invention, this is also accomplished by the anti-skating spring 21 mounted on the vertical pivot 19 which applies a force to the tone arm 80 in the direction away from the center of the record. This force will pull the tone arm 80 from the position shown by the dotted lines to the position shown by the solid lines. This will therefore pull the stylus arm 81 away from the record center and substantially eliminate the tracking error. In practice the anti-skating spring is selected to exert a force slightly larger than that calculated by Equation 4 in order to compensate for the cartridge compliancy.

Therefore, it can be seen that the deleterious effects introduced by the skating force and the compliancy of cartridges and stylus arms in a disc record reproducing system are overcome by the application of an anti-skating force. In the present invention, this anti-skating force is produced by a spring which is mounted on the vertical pivot and which acts in a direction away from the center of the record.

While certain preferred embodiments of the invention have been shown and described, it is to be understood that the invention may be otherwise embodied and practiced within the spirit of this disclosure and within the scope of the appended clamis.

What is claimed is:

1. The combination comprising a tone arm adapted for use with a rotating record, means for mounting said arm with respect to said rotating record including a stationary member, a vertical pivot connected to said tone arm which allows said arm to track in a normal direction on said rotating record in a plane substantially perpendicular to the axis of the vertical pivot, and a spiral spring located over said vertical pivot and connected between said stationary member and said vertical pivot shaft for exerting a force on said tone arm in a direction opposite to said normal direction.

2. The combination comprising a tone arm adapted for use with a rotating record, means for mounting said arm with respect to said rotating record including a stationary member, said stationary member having a hollow portion and a slot therein, a vertical pivot shaft within said member connected to said tone arm which allows said arm to track in a normal direction on said rotating record in a plane substantially perpendicular to the axis of the vertical pivot, said vertical pivot shaft having a slot therein, a spiral spring located around said vertical pivot shaft, said spiral spring having one end thereof connected to the slot in said member and the other end to the slot in the vertical pivot shaft for exerting a force on said tone arm in a direction opposite to said normal direction.

3. In a system for reproducing signals recorded in a plurality of grooves on a record which is rotated, the combination comprising a tone arm having a stylus at one end thereof, a stationary member, a vertical pivot for said tone arm mounted with respect to said tone arm to allow continuous tracking of the stylus in the grooves with a tracking force substantially in a direction normal to the plane of the record, the force exerted on the stylus by the groove producing a first force which moves said stylus and said arm in the plane of the record thereby producing a tracking force component in a plane parallel to the plane of the record, and a spiral spring having the respective ends thereof connected to said stationary member and said vertical pivot for exerting a force in said parallel plane opposite in direction to said first force.

4. The combination set forth in claim 3 wherein said first force is equal to $F \tan \alpha$, where:

$F$ = the functional force between the stylus and the groove, and $\alpha$ = the angle between a line drawn tangent to the groove at the point of stylus contact and a line drawn from the vertical pivot to the stylus.

References Cited in the file of this patent

UNITED STATES PATENTS 1,866,403 Elmer ------------------- July 5, 1932

OTHER REFERENCES

Audio Engineering, vol. 36, issue 10, pp. 64, 79, 80, October 1952.